No. 689,440. Patented Dec. 24, 1901.
G. R. TUSKA.
PRESSING APPARATUS.
(Application filed Feb. 18, 1901.)
(No Model.) 5 Sheets—Sheet 1.

No. 689,440. Patented Dec. 24, 1901.
G. R. TUSKA.
PRESSING APPARATUS.
(Application filed Feb. 18, 1901.)
(No Model.) 5 Sheets—Sheet 3.
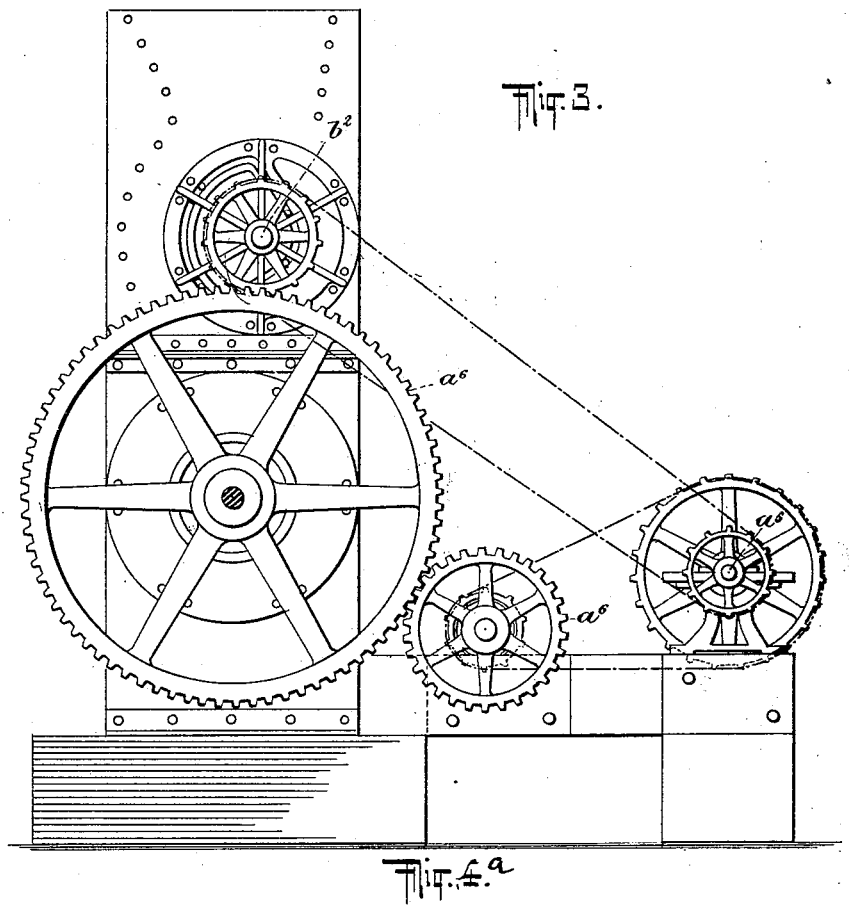
Fig. 3.
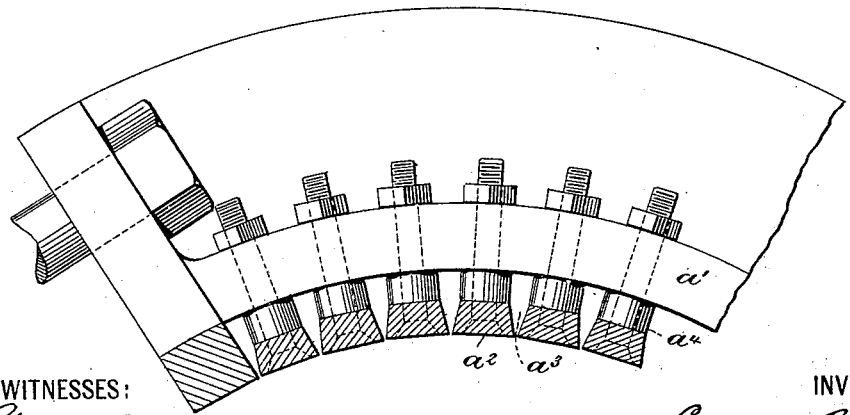
Fig. 4ª.
WITNESSES: INVENTOR
Gustave R. Tuska
BY Briesen & Knauth
ATTORNEYS No. 689,440. Patented Dec. 24, 1901.
G. R. TUSKA.
PRESSING APPARATUS.
(Application filed Feb. 18, 1901.)

(No Model.) 5 Sheets—Sheet 4.

WITNESSES: INVENTOR

No. 689,440. Patented Dec. 24, 1901.
G. R. TUSKA.
PRESSING APPARATUS.
(Application filed Feb. 18, 1901.)

(No Model.) 5 Sheets—Sheet 5.

WITNESSES:
Gustav Dieterich
Th. Edmore

INVENTOR
Gustav R. Tuska
BY Briesen & Knauth
ATTORNEYS

UNITED STATES PATENT OFFICE.

GUSTAVE R. TUSKA, OF NEW YORK, N. Y.

PRESSING APPARATUS.

SPECIFICATION forming part of Letters Patent No. 689,440, dated December 24, 1901.

Application filed February 18, 1901. Serial No. 47,779. (No model.)

*To all whom it may concern:*

Be it known that I, GUSTAVE R. TUSKA, a citizen of the United States, residing in the city, county, and State of New York, have invented certain new and useful Improvements in Pressing Apparatus, of which the following is a specification.

My invention relates to apparatus for expressing juices, water, or oil, as the case may be, from any desired material.

To this end my invention consists in two features—first, in a casing for facilitating the pressing, and, second, in a feeder for feeding the material to the said casing in a more or less compressed condition, the feeder-casing and associated apparatus constituting a single unitary structure.

In the accompanying drawings I have illustrated an apparatus embodying my invention.

Figure 1:
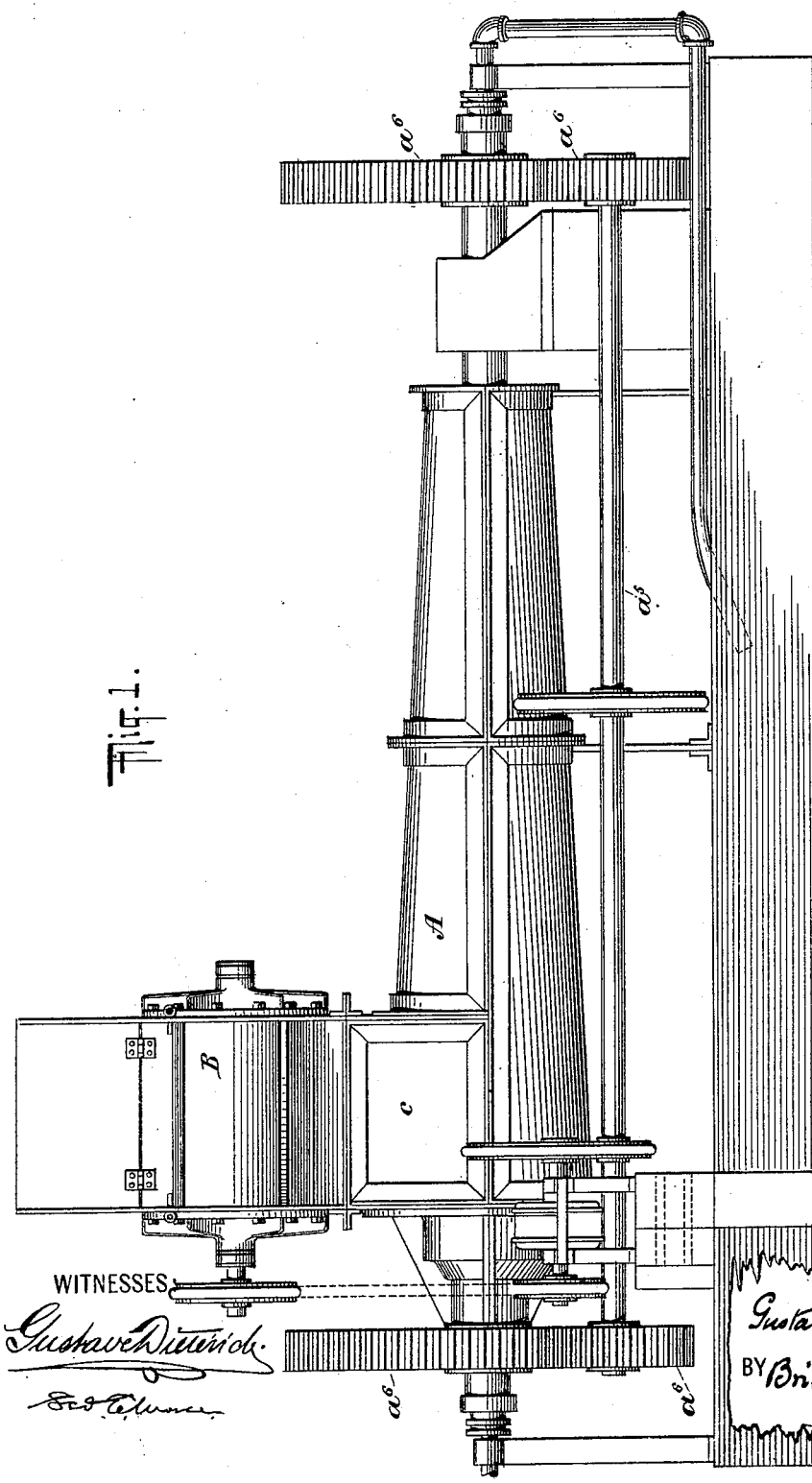
Figure 2:
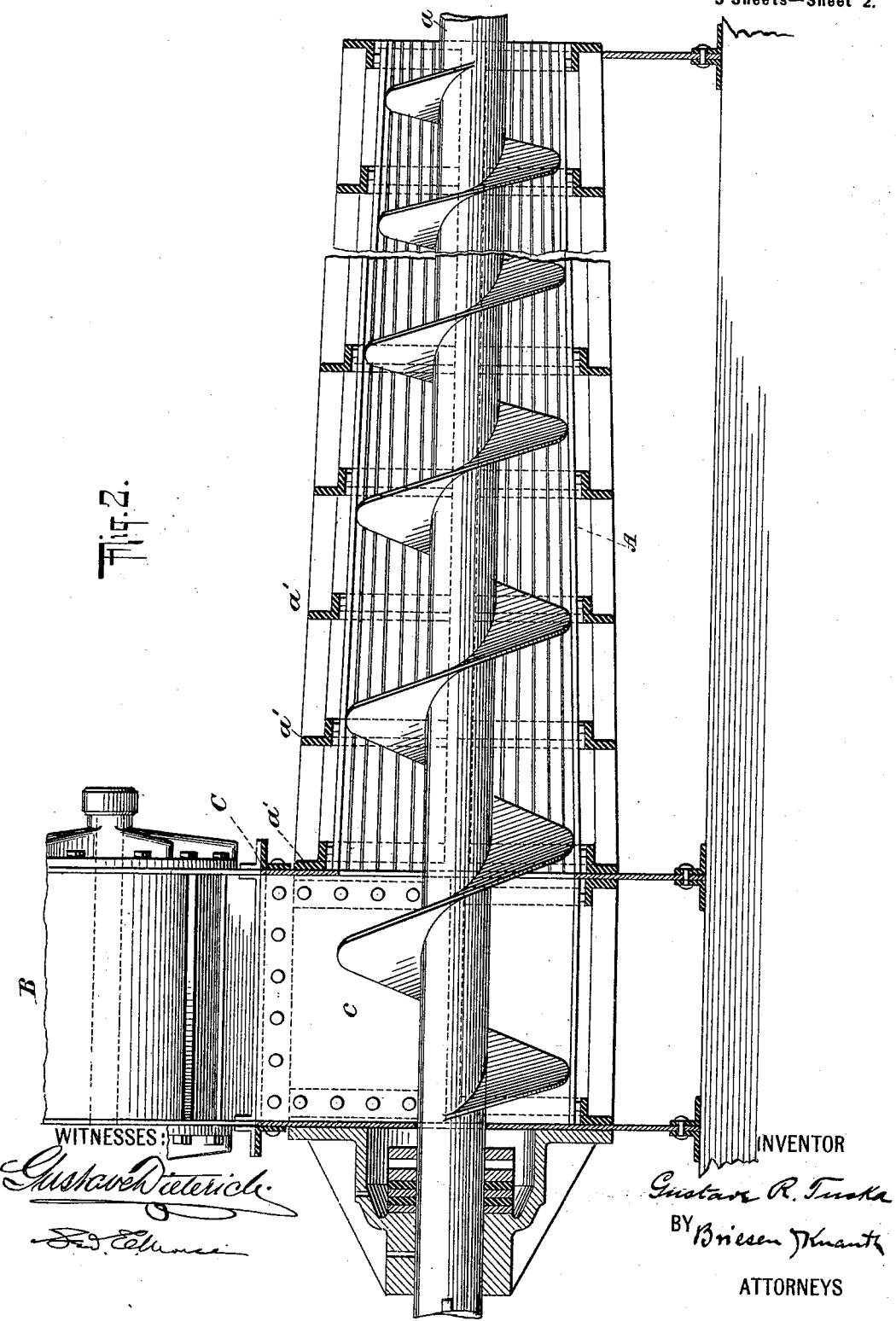
Figure 4:
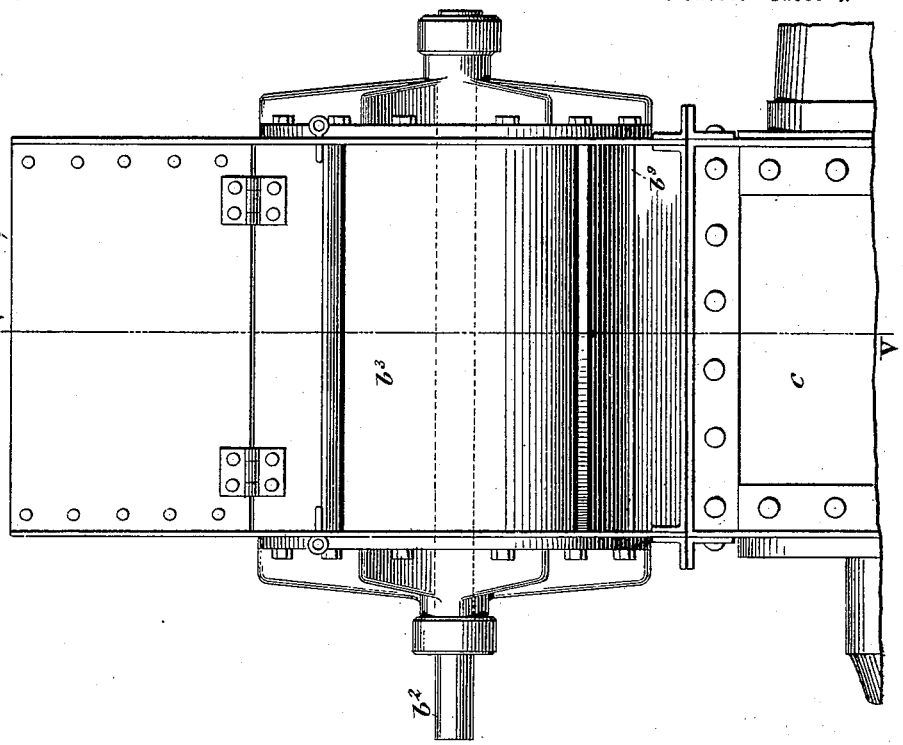
Figure 5:
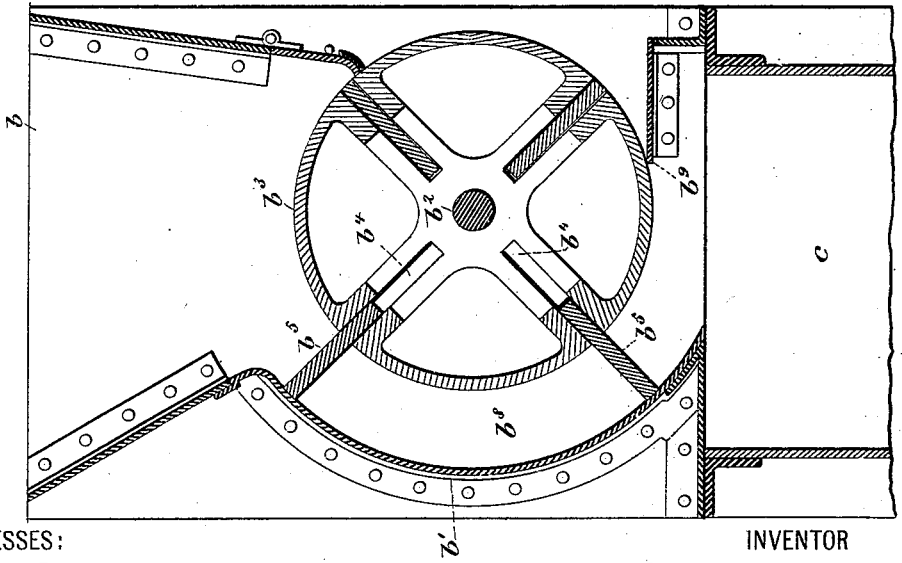
Figure 6:
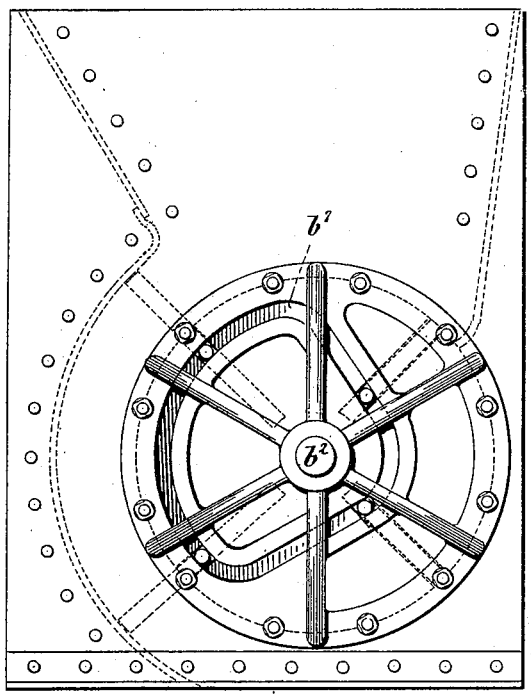
Figure 9:
Figure 10:
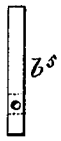
Figure 7:
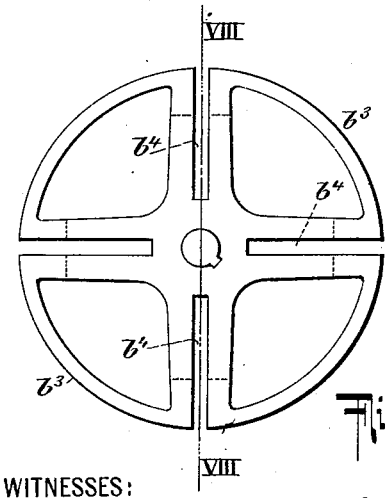
Figure 8:
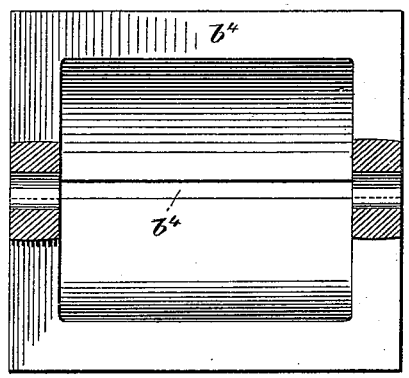
Figure 11:
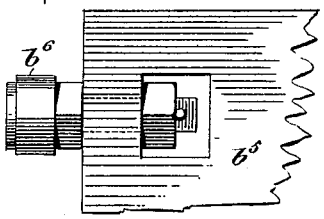

In the drawings, Figure 1 is a side elevation of a press wherein my invention is embodied. Fig. 2 is a sectional elevation thereof. Fig. 3 is an end view of the apparatus. Fig. 4 is a side elevation of the feeding and compressing device for supplying the material to the Archimedean-screw press. Fig. 4$^a$ is an enlarged sectional detail view of the slats of the casing. Fig. 5 is a section thereof on line V V of Fig. 4. Fig. 6 is a detail view of the cam mechanism for operating the wings of the feeder. Fig. 7 is a side view of the rotating cylinder carrying the wings. Fig. 8 is a section on line VIII VIII of Fig. 7. Fig. 9 is a detail view of one of the wings. Fig. 10 is an edge view thereof. Fig. 11 is an enlarged detail view of the bowl for engaging in the cam-groove.

Before describing the apparatus in detail I will briefly refer to its constituent parts.

In the drawings, A represents a press for expressing juices, oils, &c., from material—such, for instance, as fish or garbage. B represents a feeder for the press. These parts are so combined as to coöperate with each other.

The press A consists of an Archimedean screw $a$, working in a tapering casing. This tapering casing consists of rings $a'$, which are suitably secured together and carry slats $a^2$. The casing constituted by the slats and the rings is frusto-conical. These slats $a^2$ extend from end to end of the casing and are mechanically continuous. By employing the term "mechanically continuous" I do not mean to imply that each slat or bar $a^2$ is in one piece continuous from end to end, but merely that each slat, whether in one piece or more, shall extend from end to end of the casing, so that the movement of the mass through the casing shall be unobstructed. These slats $a^2$ are so shaped that the spaces between them, $a^3$, shall be V-shaped—that is, wider at the outside of the casing than at the inside. The slats $a^2$ are also spaced away from the rings $a'$ by washers or spacers $a^4$, so that bones or other like articles projecting from the mass between the slats shall not be caught by the rings $a'$. It will be seen that by constructing the casing in the manner just described it will be entirely free and unobstructed from end to end and there will be no cross-pieces to obstruct the flow or movement of the substances in the casing and that the casing thus constructed will operate in a perfectly efficient manner. The shaft carrying the Archimedean screw may be driven in any suitable manner. In the present instance I have shown it as driven from the counter-shaft $a^5$ by gearing $a^6$. The operation of this part of my invention will be too well understood to need description.

At the beginning or entry end of the press is a suitable hopper or casing C, into which the material is fed initially. Mounted in this hopper or casing is the feeder B, which feeder also serves the purpose of compressing the charge and dropping the same so compressed into the chamber $c$ of the press-casing. This feeder consists of a chute or hopper $b$, provided with a casing $b'$, which is concentric with the shaft $b^2$ of a rotating feeder-cylinder $b^3$. The shaft $b^2$ is preferably driven from the shaft $a^5$ by suitable driving connections. This rotating feeder-cylinder is provided with slots $b^4$, in which work blades $b^5$ or their equivalents. The blades $b^5$ are each provided with bowls or rollers $b^6$, which take in cam-grooves $b^7$ at either end of the feeder.

The operation of the feeder is as follows: The material to be pressed, such as fish or garbage, is dropped into the hopper $b$ and is carried around by the cylinder and blades, the blades being gradually forced outward by the cam $b^7$, so that a considerable amount of material will be inclosed and compressed in the space $b^8$ between the casing-cylinder and two of the blades $b^5$. As the cylinder rotates to bring this material to the chamber $c$ the blade $b^5$, which is in front of the portion of the charge contained within the space $b^8$, will be withdrawn into its slot by the cam and will allow the charge contained within the space $b^8$ to be forced into the chamber $c$, the blade being at the same time drawn into the cylinder, so as to run clear of the doctor $b^9$. As but one side of the apparatus can be used for feeding, the cylinder need not necessarily be inclosed on the opposite side, and in the present instance it is shown as not inclosed.

Having described my invention, what I claim, and desire to secure by Letters Patent, is—

1. A casing for presses comprising a series of rings, a series of continuous slats extending longitudinally of the casing and tapering in the direction of their length, the said slats being spaced away from the rings by suitable spacing devices, substantially as described.

2. A casing for Archimedean-screw presses comprising a suitable frame or support and a series of slats carried thereby, the said slats extending longitudinally of the casing and tapering from end to end, and means for spacing the said slats away from the supporting-frame.

GUSTAVE R. TUSKA.

Witnesses:
GEO. E. MORSE,
OTTO V. SCHRENK.